Dec. 14, 1965    L. R. FITZSIMMONS    3,223,430
GOLF CART WHEEL LATCHING STRUCTURE
Filed May 11, 1964    5 Sheets-Sheet 1

LLOYD R. FITZSIMMONS
INVENTOR.

BY
BUCKHORN, BLORE, KLARQUIST and SPARKMAN
ATTORNEYS

Dec. 14, 1965 L. R. FITZSIMMONS 3,223,430
GOLF CART WHEEL LATCHING STRUCTURE
Filed May 11, 1964 5 Sheets-Sheet 3

LLOYD R. FITZSIMMONS
INVENTOR.
BY
BUCKHORN, BLORE, KLARQUIST and SPARKMAN
ATTORNEYS Dec. 14, 1965  L. R. FITZSIMMONS  3,223,430
GOLF CART WHEEL LATCHING STRUCTURE
Filed May 11, 1964  5 Sheets-Sheet 4

LLOYD R. FITZSIMMONS
INVENTOR.
BY
BUCKHORN, BLORE, KLARQUIST & SPARKMAN
ATTORNEYS

United States Patent Office 3,223,430
Patented Dec. 14, 1965

3,223,430
GOLF CART WHEEL LATCHING STRUCTURE
Lloyd R. Fitzsimmons, Portland, Oreg., assignor to Product Engineering Company, Portland, Oreg., a corporation of Oregon
Filed May 11, 1964, Ser. No. 366,562
17 Claims. (Cl. 280—42)

This invention relates to golf carts, and more particularly to collapsible golf carts.

An object of the invention is to provide new and improved golf carts.

Another object of the invention is to provide new and improved collapsible golf carts.

A further object of the invention is to provide a collapsible golf cart which may be extended by moving an actuator and which may be folded by moving the actuator to unlatch the wheels to permit them to move automatically to folded positions.

Another object of the invention is to provide a golf cart having a pedal type actuator for moving wheels from collapsed to extended positions.

Yet another object of the invention is to provide a collapsible golf cart in which wheels thereof are movable automatically to collapsed positions when a latch is released.

Yet another object of the invention is to provide a collapsible golf cart in which an actuator is operable to sequentially release a latch and move wheels from collapsed positions to extended positions upon sustained manual force applied thereto, to latch the wheels in such extended positions, to release the latching of the wheels upon momentary application of force to the actuator to permit the wheels to move to collapsed positions by gravity and then to latch the wheels in the collapsed positions thereof.

A still further object of the invention is to provide a collapsible golf cart having a parallelogram linkage supporting each wheel in extended positions relative to a frame of the golf cart and having opposed links which move into interlocking relationship to form a unitary structure when the wheel carried thereby is in its extended position.

The invention provides a collapsible golf cart in which a pair of wheels is movable from collapsed positions adjacent the frame to extend positions spaced from the frame by an actuator. Preferably the actuator includes a pedal mounted on an actuator lever with lost motion therebetween, with the pedal serving to first move a latch to a releasing position and then swing the lever in a direction pulling a slide on the frame, which carries racks meshing with pinions connected to leg mechanisms supporting wheels, and pivot the leg mechanisms from collapsed positions to positions extending angularly away from the frame to move the wheels to extended positions. The latch moves under a fixed latching member when the wheels are in their extended positions, and the pedal is released and the latch holds the wheels in their extended positions. The pinions preferably are provided with large-toothed rack portions at the ends thereof which interlock with the rack when the wheels are moved to their extended positions to take all play out of the racks and pinions, and to strongly hold the wheels in their extended positions. When the pedal is actuated momentarily, it moves the latch to a position out of engagement with the latching member and the wheels move the leg mechanisms by gravity back to their collapsed positions. Preferably each leg mechanism includes a pair of parallel arms which are generally U-shaped in cross section and one of the arms is adapted to move laterally partly into the U-shaped chamber of the other arm, both when the arms are in their collapsed positions adjacent the frame and when the arms are in their extended positions projecting away from the frame so that the arms form, in effect, a unitary structure both when collapsed and when extended relative to the frame to provide greater strength in their combined form than they provide individually.

A complete understanding of the invention may be obtained from the following detailed description of golf carts forming specific embodiments thereof, when read in conjunction with the appended drawings, in which:

FIG. 9 is a generally horizontal sectional view in enlarged scale taken substantially along line 9—9 of FIG. 8;

Referring now in detail to the drawings, there is shown therein a golf cart 12 which includes a central frame in the form of a tubular post or tube 14 having fixed to the upper end thereof a top housing or bracket 16 carrying bag holding arms 18 which are provided with strap-receiving eyes 20 and are secured pivotally to a bracket portion 22 of the top housing 16 by capscrews 24. The top housing 16 also includes a coupling member 26 to which a handle 28 is adjustably secured, and the coupling member 26 and a cooperating coupling member 30 of the handle 28 are manually releasable to permit the handle to be moved to any selected position in a range of positions extending from an extreme extended position thereof located substantially above that shown in FIG. 1 to a folded position extending down along the tube 14. A base in the form of a split clamp, bottom housing or bracket 32 is fixed rigidly to the lower end of the tube 14, and includes a cover 34 fastened to a body portion 36 by capscrews 38 threaded into tapped bores (not shown) in the body portion 36. The housing 32 also includes a lower shelf or support 42 projecting forwardly therefrom and having plates 44 formed integrally on the bottom side thereof to serve as legs when the golf cart is stationary. The shelf 42 has bosses 46 to which bag holding arms 48 are pivotally secured by capscrews 50, the arms 48 being provided with eyes 52 for receiving a bag clamping strap (not shown). Wheels 54 mounted on axles 56 (FIG. 8) are movable by parallelogram linkages or leg mechanisms 58 between extended or running positions in which the wheels are spaced rearwardly and substantial distances laterally of the tube 14 and folded or collapsed positions for storage shown in FIG. 2, in which the wheels 54 are positioned adjacent to the sides of the tube 14 and extend only slightly rearwardly of the bottom portion of the tube 14.

A split clamp housing or bracket 60 (FIGS. 1, 8, 9 and 10) is fixedly secured to the tube 14 in a position on the intermediate portion of the tube. The housing 60 is of diecast construction and includes a generally V-shaped rear cover 62, a generally V-shaped center block 64 and a front cover 66. Capscrews 68 threaded into tapped bores (not shown) in the cover 66 clamp the housing 60 rigidly on the tube in a fixed position thereof. A diecast slide 74 having a pair of racks 76 is mounted for sliding movement up and down the tube in guideway 78 formed by the housing 60 and tube 14. The racks 76 mesh with a pair of gear segments 80 (FIG. 8) mounted pivotally by pins 82 carried by a pair of clevis portions 84 formed by the cover 62 and the center block 64. The clevis portions 84 are positioned 90° apart. The pins 82 may be roll pins, if desired.

The gear segments 80 are formed integrally on the upper ends of links 86 of the parallelogram linkages 58 and include driving teeth 88 (FIG. 12) which mesh with driving teeth 90 of the racks 76, and each gear segment also includes large, very strong locking teeth 92 and 93 adapted to engage with large, very strong locking teeth 94, 95 and 97 of the rack 76. Planar surfaces 85 and 87 on the teeth 92 and 93 do not lie on the pitch circle of the gear segments 80 but, rather, are so positioned that, when the links 86 are in their extended positions, the surfaces 85 abut, in full face contact, planar surfaces 89 of the racks 86 to prevent further outward movement of the links 86, and when the links 86 are in their folded positions, the surfaces 87 abut, in full face contact, planar surfaces 91 of the racks 76 to prevent further inward movement of the links 86. When the links 86 are in their fully retracted positions, the teeth 93 engage in teeth 95 of the racks 76 snugly with just sufficient force to hold the slide 74 snugly against shoulder 99 at the upper end of the guideway 78, thereby holding the slide 74 to prevent rattle.

Figures 5, 6, 7, 8, 10, 11:
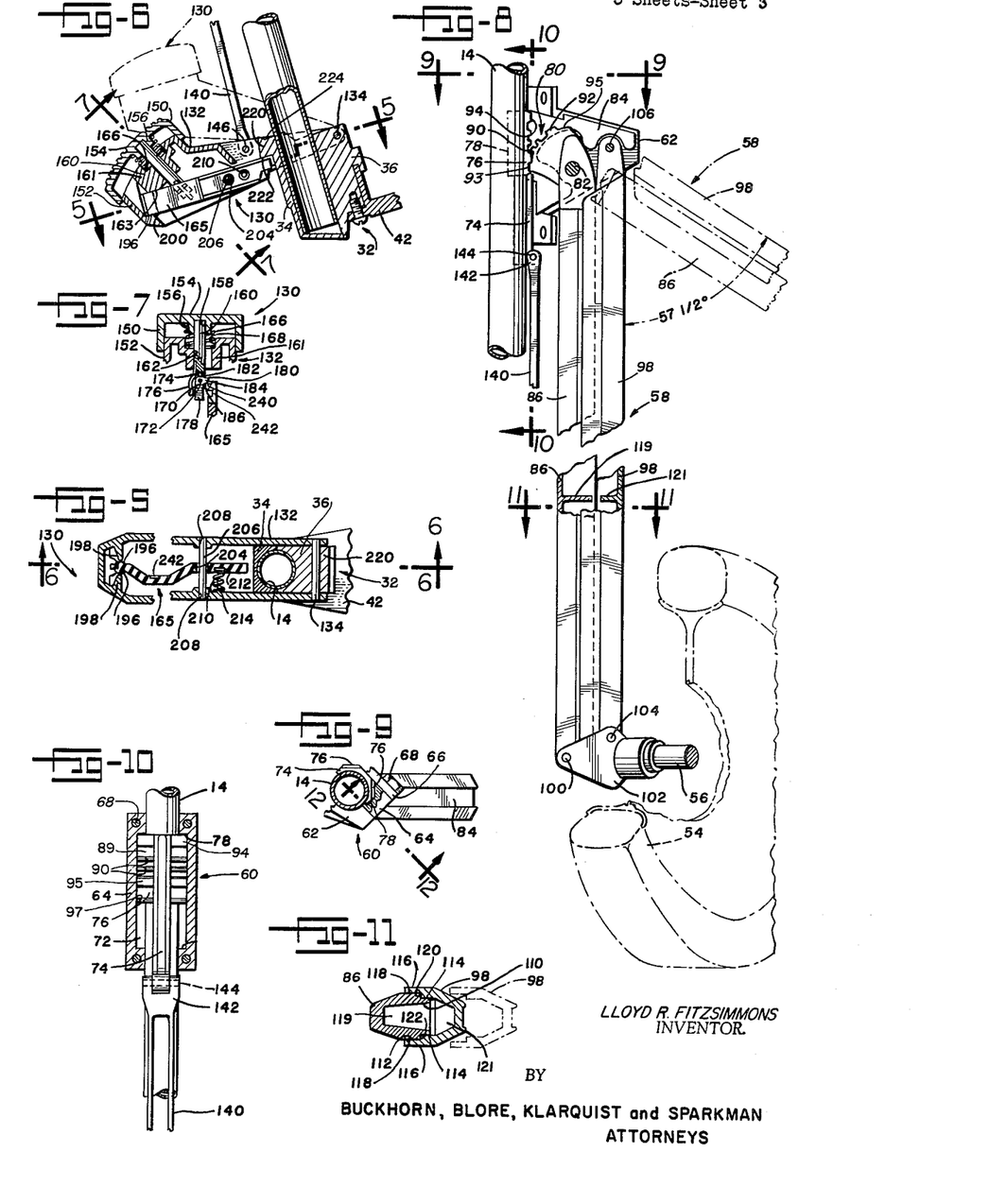
FIG. 5 is a fragmentary, horizontal sectional view in enlarged scale taken substantially along line 5—5 of FIG. 1.
FIG. 6 is a fragmentary, vertical sectional view taken substantially along line 6—6 of FIG. 5.
FIG. 7 is a generally vertical sectional view in enlarged scale taken substantially along line 7—7 of FIG. 6.
FIG. 8 is a fragmentary sectional view in enlarged scale taken substantially along line 8—8 of FIG. 2.
FIG. 10 is a fragmentary, vertical sectional view in enlarged scale taken substantially along line 10—10 of FIG. 8.
FIG. 11 is a generally horizontal sectional view in enlarged scale taken along line 11—11 of FIG. 8.

When the slide 74 is pulled downwardly along the tube 14, each link 86 is pivoted from its folded or collapsed position, as illustrated in full lines in FIG. 8, counterclockwise to its extended position shown in phantom lines in FIG. 8, this movement thereof being through an angle of about 57½°. In the extended positions of the links 86, the links 86 and oppositely positioned, parallel links 98 of the linkages 58 are in their operative or running positions. The lower ends of the links 86 are pivotally connected by pins 100 carried by clevis portions of short bottom links 102 rigidly supporting the axles 56, and the lower ends of the links 98 are connected by pins 104 to clevis portions of the links 102. The upper ends of the links 98 are connected by pins 106 to the clevis portions 84 of the blocks 62 and 64.

Figure 12:
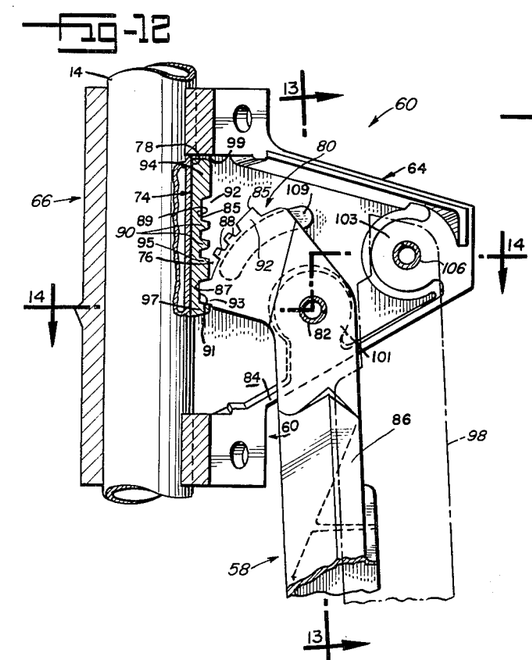
FIG. 12 is an enlarged, fragmentary, vertical sectional view taken along line 12—12 of FIG. 9.
Figure 13:
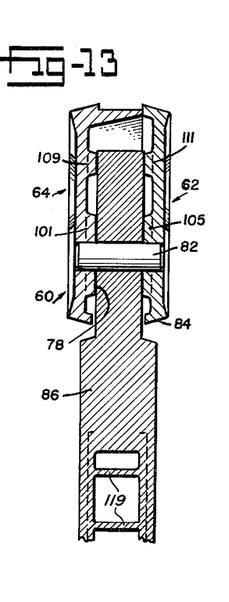
FIG. 13 is an enlarged, fragmentary, substantially vertical sectional view taken along line 13—13 of FIG. 12.
Figure 14:
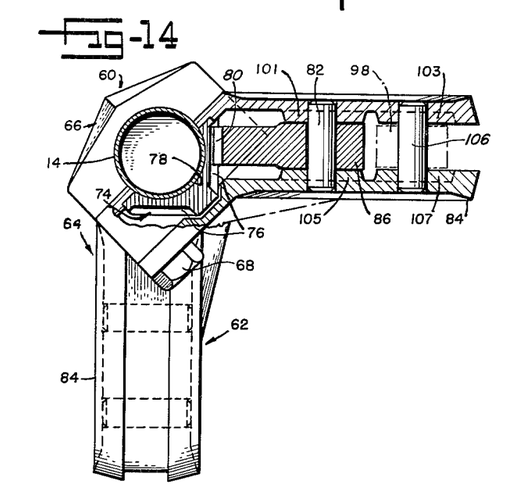
FIG. 14 is an enlarged, fragmentary, horizontal sectional view taken substantially along line 14—14 of FIG. 12.

As best shown in FIGS. 12 to 14, the arms of the center block 64 have bosses 101 and 103 aligned with bosses 105 and 107, respectively, on the arms of the rear cover 62 closely and slidably engaging opposite side faces of the upper end portions of the links 86 and 98. The center block 64 and the rear cover 62, respectively, have thick, opposed arcuate guides 109 and 111 engaging the side faces of the upper ends of the links 86 to provide further bearing support for pivotal movement of the links relative to the housing 60.

The links 86 and 98 (FIGS. 8 and 11) are diecast and channel-like and have open mouths 110 and 112 facing each other. When the wheels 54 are in their folded or collapsed positions, each pair of links 86 and 98 are angularly at one side of positions thereof perpendicular to a line joining the pins 82 and 106 and are positioned closely together in laterally abutting relationship, and when the wheels 54 are in their extended positions, the links are angularly at the other side of positions thereof perpendicular to the line joining the pins 82 and 106 and are in laterally abutting relationship. The links 86 are provided with reduced upper edge portions 114 which fit between the arms of the channel-like links 98 and the links 98 have outer edge portions 116 which fit slidably over flat side portions 118 of the links 88. A plurality of webs or gussets 119 (FIGS. 8 and 11) are spaced along each link 86 and a plurality of webs or gussets 121 are spaced along each link 98. The webs 119 and 121 extend transversely to the links and transmit forces from one side of each link to the other side thereof, thereby greatly increasing the strength of the links. Shoulders or stops 120 formed on the inside of the arms of the links 98 engage shoulders or stops 122 formed on the outside of the arms of the links 86. This interfitting construction of the arms of the links 86 and 98, when they are in interfitted relationship, a unitary structure which adds greatly to the strength and appearance of the linkages 58. The centers of the pins 82, 100, 104 and 106 are such that the links 86 and 98 are in fully closed positions when the wheels 54 are in their folded or collapsed positions, and are also in their fully closed positions when the wheels are in their extended positions. When the links 86 and 98 are in either their extended or collapsed positions, the axles 56 are aligned and horizontal and the wheels 54 are in parallel vertical planes. In the movement of the links 86 and 98 from their collapsed positions to their extended positions, the links at first move slightly apart from their fully overlapping positions and then reclose as they arrive at their extended positions, and any tendency to move the links 86 and 98 further than these extreme positions thereof tends to force the links 86 and 98 more tightly together to prevent such further movement.

Figure 1:
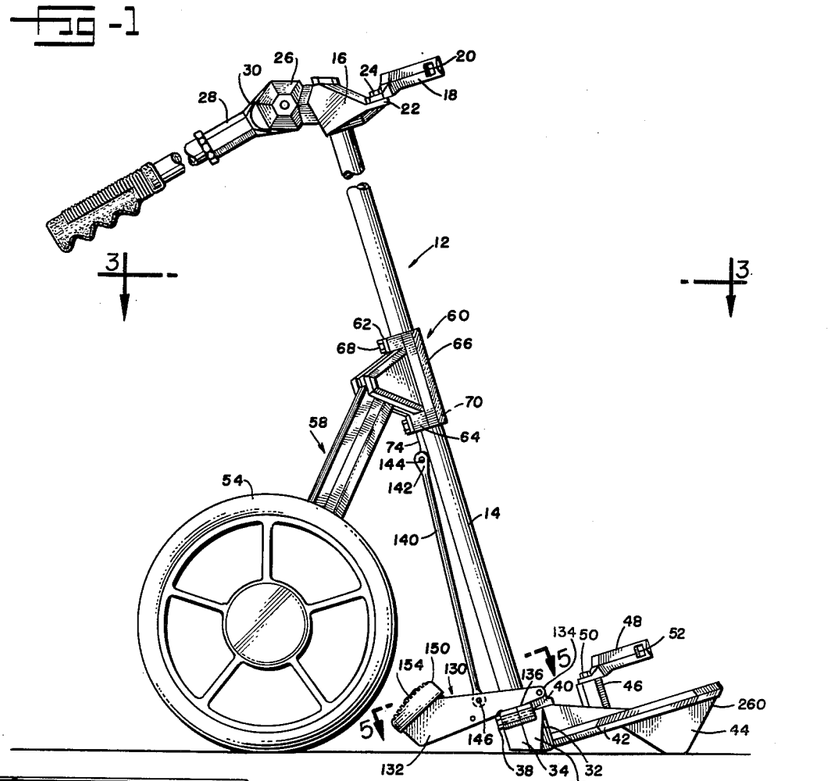
FIG. 1 is a fragmentary side elevation view of a golf cart forming one embodiment of the invention, with the wheels thereof in extended positions.
Figure 2:
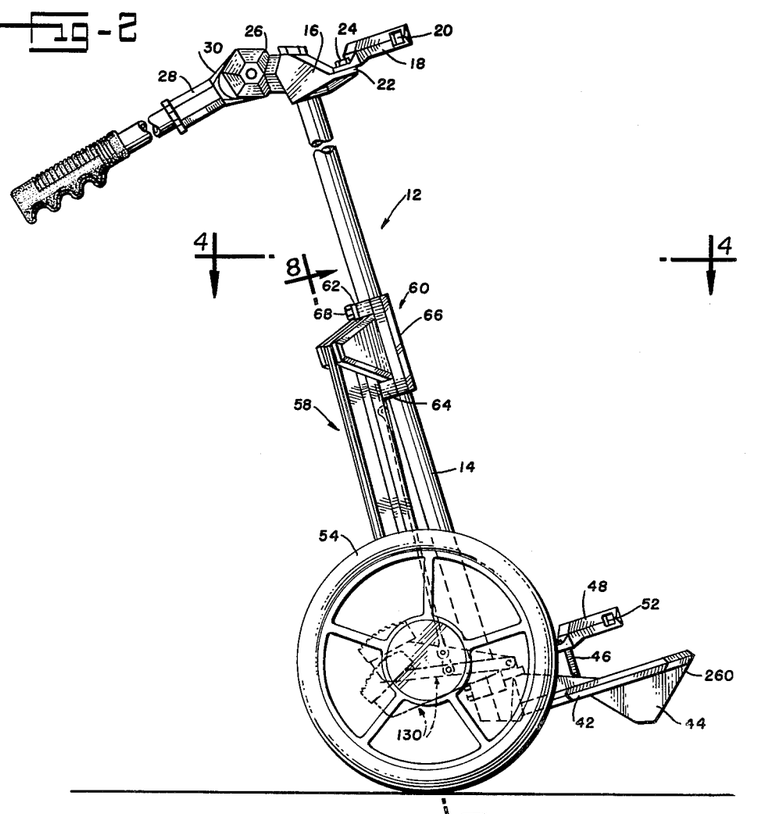
FIG. 2 is a view similar to FIG. 1 but with the wheels positioned in folded or collapsed positions relative to the frame of the golf cart.
Figure 3:
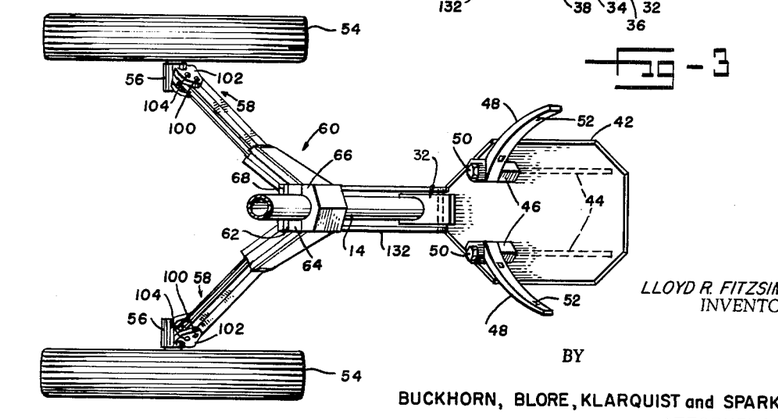
FIG. 3 is a horizontal sectional view taken substantially along line 3—3 of FIG. 1.
Figure 4:
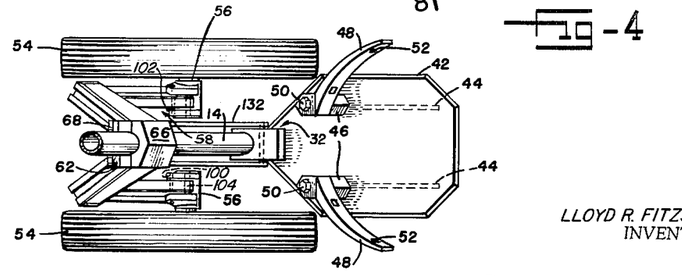
FIG. 4 is a horizontal sectional view taken substantially along line 4—4 of FIG. 2.

A pedal actuator or foot assembly 130 (FIGS. 1, 2 and 5 to 7) includes a trigger housing or lever 132 mounted pivotally by a pin 134 on the bottom housing 32, between a lower position abutting upper face 136 of the housing 32, as illustrated in FIG. 1, and a second, raised position illustrated in FIG. 2, and is latched selectively in either of these positions. A link 140 has a forked end 142 (FIG. 10) connected by pin 144 to the lower shank end of the slide 74, and is connected pivotally by a pin 146 (FIGS. 1 and 6) to the intermediate portion of the lever 132. When the lever 132 is in its lower position, as illustrated in FIG. 1, it holds, through the link 140, the slide 74 in a position holding the linkages 58 and the wheels 54 in their extended positions. When the lever 132 is unlatched from the lower position thereof, the weight of the wheels 54 and the linkages 58 moves the slide 74 upwardly and pulls the lever 132 to its upper positions, as illustrated in FIG. 2, the wheels 54 and linkages 58 moving by gravity from their extended positions to their collapsed positions.

The actuator 130 (FIGS. 1 and 5 to 7) includes a foot block or pedal 150 which is cup-shaped and mounted slidably on somewhat upwardly extending end portion 152 of the lever 132, the pedal 150 being provided with a tread 154 facing generally upwardly. The pedal has a boss 156 (FIG. 7) provided with a socket 158 receiving in press-fitted engagement the upper end of guide rod 160 which is slidable in guide bore 162 in the lever 132. A bridge portion 161 (FIG. 6) is provided with a bottom stop surface 163 which is engaged by a trigger or latching bar 165, and the bridge portion also limits downward movement of the pedal 150 relative to the lever 132. A compression spring 166 bearing at its upper end against the pedal 150 and seated at its lower end in a counterbore 168 in the lever 132 urges the pedal to an extreme upward position, as viewed in FIG. 6. This upward movement of the pedal is limited by an L-shaped camming dog 170 (FIG. 7) mounted pivotally by a pin 172 in a slotted end portion 174 of the rod 160. A leaf spring 176 fixed to the rod 160 at the upper end of the leaf spring bears against arm 178 of the camming dog 170 to urge the dog toward a position in which face 180 of arm 184 of the dog engages an end 182 of the slot in the lower end of the rod 160. The arm 184 of the dog also is provided with camming portion 186.

The latching bar 165 has cylindrical end portion 196 (FIG. 5), which fits pivotally between rounded edges of ribs 198 of the lever 132, and rests on shoulder 200 (FIG. 6) of the lever 132. The latching bar (FIG. 5) has a bore 204 therein through which loosely extends a pin 206 press fitted into aligned bores 208 in the lever 132. The pin 206 retains the latching bar 165 in the position shown in the drawings, while permitting pivotal movement of the latching bar relative to the trigger housing about the cylindrical end portion 196 thereof. The lever 132 preferably is composed of cast aluminum and the latching bar preferably is composed of nylon. A compression spring 210 is seated in socket 212 formed in the latching bar and over boss 214 on one of the sides of the lever 132, and urges the latching bar in a clockwise direction, as viewed in FIG. 5, relative to the lever 132 toward a latched position either above or below a latching block portion 220 (FIG. 6) integral with the bottom housing 32. The spring 210 permits movement of the latching bar 165 in a clockwise direction, as viewed in FIG. 5, to an unlatching position completely clearing bottom surface 222 (FIG. 6) of the latching block portion 220. When the lever 132 is in its upper position, the latching bar is over top surface 224 of the latching block portion 220, which latches the latching bar and the lever 132 in their upper positions.

When the pedal 150 is moved downwardly on the lever 132, it first moves camming portion 186 of the dog 170 into engagement with a sloping camming surface 240 (FIG. 7) of the latching bar 165, and moves the latching bar clockwise, as viewed in FIG. 5 to move the latching end of the latching bar, which is the righthand end of the latching bar as viewed in FIG. 5, out of latching engagement with the block 220. Then on further downward movement of the pedal 150, the dog 170 moves out of engagement with the camming surface 240 and moves opposite a clearance notch 242 in the latching bar, which permits the latching bar to move back into latching engagement provided the latching bar has not been moved vertically to a position in which the latching block portion 220 prevents movement of the latching bar to its latching position. Assuming the actuator 130 is in its upper position, as illustrated in phantom in FIG. 5, when the pedal is moved downwardly, continued downward pressure on the pedal moves the lever 132 downwardly to move the latching end of the latching bar to a position abutting the side of the latching block 220 to prevent movement of the latching bar back into latching engagement. This movement is permitted by the slight play backlash present between the link 140, the lever 132, the slide 74, the racks 76 and gear segments 80. As downward movement of the pedal continues, the racks 76 are pulled downwardly along the tube 14 and swing the linkages 58 and the wheels 54 outwardly and upwardly to the extended positions thereof. When the wheels and linkages arrive at the extended positions, the teeth 92 (FIG. 12) of the gear segments 80 are in tight engagement with the racks 76, and the teeth are large and strong and rigidly hold the linkages 58 and wheels 54 in their extended positions.

As the linkages 58 and the wheels 54 reach their extended positions, the latching end of the latching bar 165 moves under the bottom surface 222 of the block 220 and latches the lever 132 in its lower position. Then pressure on the pedal 150 is released and the wheels 54 and linkages 58 remain in their extended positions latched by the latching bar and the trigger block 220. In these positions, the gear segments 80 lock with the racks 76 so that the wheels 54 and linkages 58 are held rigidly outwardly in these positions. The link 140 is under slight tension at this time so that there is no backlash or slack in the coupling between the latching block portion 220 and the linkages 58. Also, when the weight of the cart and golf bag is placed on the wheels 54 the links 86 are urged firmly against the links 98 to make a rigid unitary structure therewith.

To release the wheels 54 and linkages 58 from their extended positions and collapse the cart, the cart is tilted clockwise, as viewed in FIG. 1, on the plates 44 to raise the wheels 54 somewhat off the ground. Then the pedal 150 is moved downwardly on the end of the lever 132, and when the pedal has moved only a part of the full distance downwardly on the end of the lever 132, the camming dog 170 cams the latching bar 165 out of latching engagement. Since the weight of the wheels 54 and linkages 58 is transmitted to the link 140, the lever 132 then is pivoted counterclockwise, as viewed in FIG. 1, to move the lefthand end of the lever 132 upwardly from its lowermost position before the foot pedal bottoms on the lever 132, the spring 166 permitting this movement. This movement of the lever 132 moves the latching bar 165 upwardly relative to the latching block portion 220 to a position in which the latching bar will not go under the latching block 220 into latching engagement. Then the operator removes his foot from the pedal 150, and the weight of the wheels 54 and the linkages 58 in their raised, extended positions causes the wheels and linkages to swing to their collapsed positions and move the lefthand end of the lever 132 up to its upper, latched position, the spring 210 (FIG. 5) pushes the latching bar 165 over the top surface 224 (FIG. 6) of the latching block portion 220, and the wheels 54 and linkages 58 are latched in their collapsed positions lying alongside the tube 14 to provide a compact structure. The plates 44 are provided with sloping forward surfaces 260 to permit the cart to be tilted forwardly for opening and closing the wheels thereof, and provides a firm support for these operations.

The above-described golf cart 12 is very convenient to place in its operative or collapsed conditions. The wheels 54 and linkages 58 may be moved from their collapsed positions for storage to their extended positions for running simply by the user holding the upper end of the tube 14 with his hand and pushing the actuator 130 from its upper latched position downwardly to its lower latched position. The wheels 54 and linkages 58 may be moved from their extended positions to their collapsed positions merely by tilting the cart forwardly onto the surfaces 260 and pressing the pedal 150 of the actuator 130 momentarily to release the latch of the lever 132, and the weight of the wheels 54 and linkages 58 moves the actuator 130 to its upper latched position and themselves to their compact, collapsed or folded positions. The links 86 and 98, while being separate to act as parallelogram linkages with the links 102 and the clevises 84, interlock when the wheels are in their extended positions to provide a rugged, unitary beam structure, and there is no slack or play in the linkages holding the wheels in their extended positions. This rigidity also is aided by the strong locking action of the gear segments 80 and the racks 76.

Figure 15:
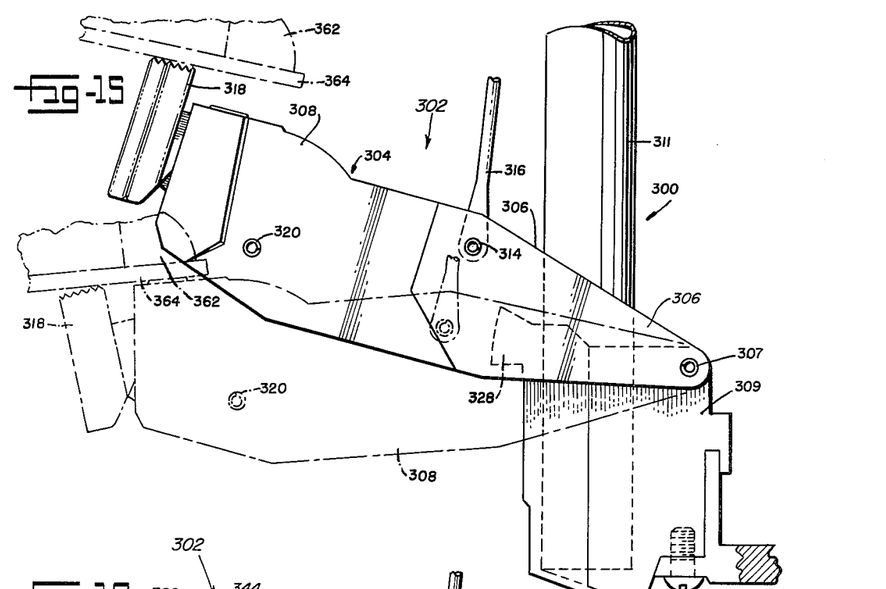
FIG. 15 is an enlarged, fragmentary, side elevation view of a golf cart forming an alternate embodiment of the invention.
Figure 16:
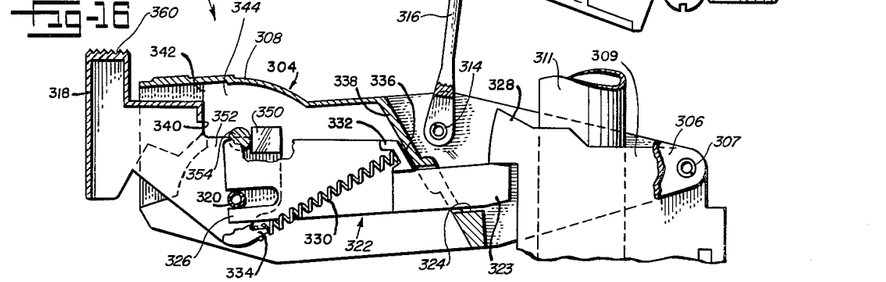
FIG. 16 is an enlarged, fragmentary, vertical sectional view of the golf cart of FIG. 15.
Figure 17:
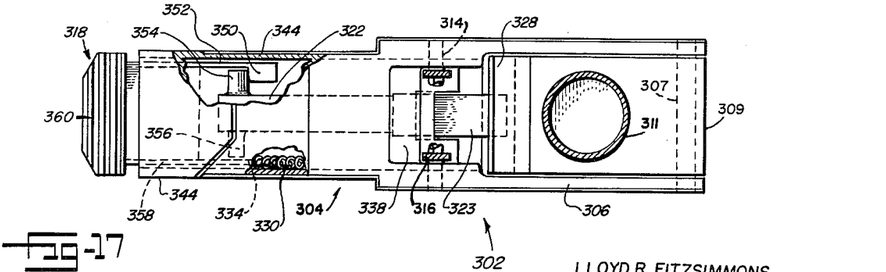
FIG. 17 is an enlarged, fragmentary, generally horizontal sectional view of the golf cart of FIG. 15.

In FIGS. 15 to 17 there is shown a golf cart 300 identical to the golf cart 12 except for an actuator 302. The actuator 302 includes a diecast lever 304 having a fork 306 pivotally secured by pin 307 to bottom housing 309 secured to frame 311. The lever 304 also includes housing portion 308, which is channel-shaped in transverse cross section, and is secured by pin 314 to link 316. The link 316 is attached at its upper end to a slide (not shown) identical to the slide 74 (FIG. 12) for actuating leg mechanisms (not shown) identical to the leg mechanisms 58. A foot pedal trigger button 318 is pivotally mounted on the lever 304 by pin 320. The lever 304 is pivotal on the pin 307 from an upper, folded or storage position shown in full lines in FIG. 15 holding the leg mechanisms and wheels (not shown) in collapsed positions and a lower, operative position shown in broken lines in FIG. 15 holding the leg mechanisms and wheels in their spread, operative position.

A latching bolt or bar 322 (FIGS. 16 and 17) having a slightly tapered latching portion 323 and slidable in a guideway 324 has a slotted end portion 326 slidable on the pin 320 between a latching position, extending either above or below a latching block portion 328 of the bottom housing 309, and a triggered, releasing position in which the end of the bolt 322 clears the end of the latching block portion 328. One end of a floating, compression spring 330 seats in a U-shaped spring seat 332, and the other end seats on a hooked portion 334 of the trigger button 318. The compression spring 330 urges the bolt 322 toward its latching position in which shoulder 336 on the bolt abuts bridging web 338 of the lever 304 and simultaneously urges the trigger button to its upper position as shown in full lines in FIGS. 15 and 16 in which outer stops 340 of the trigger button abut shoulders 342 (FIG. 17) formed on the inside faces of the sides 344 of the lever 304 to prevent further upward movement of the trigger button.

The trigger button may be pivoted against the action of the spring 330 from its upper position to an extreme lower, releasing position as shown in broken lines in FIG. 15, and, as the button is so moved, inwardly projecting dog 350 on arm 352 of the trigger button engages and pushes to the right, as viewed in FIGS. 16 and 17, a pin 354 formed integrally with the latching bolt 322 to retract the bolt 322 first out of engagement with the latching block portion 328 and then further from the latching block portion 328. This movement of the bolt also is against the action of the spring 330. The pin 354 and a pin 356 cast integral with the bolt 322 space the blot between arms 352 and 358 of the trigger button to center the end of the bolt therebetween. It is to be noted that the single spring 330 serves to both urge the latching bolt toward its latching position and urge the trigger button to its normal, upper position. The spring 330 is confined against lateral movement by the latching bolt on one side and the adjacent side of the lever 304 on the other side, which remains the spring seated in the U-shaped spring seat 332. The trigger button has a roughened or serrated thread 360.

In the operation of the golf cart 300, the latching bolt 322 when in its upper latching position holds the wheels and leg mechanisms of the cart in their collapsed, inner running or storage positions. To move the wheels to their outer or extended, operative or running positions, the user places his shoe 362 (FIG. 15) on the trigger button 318 and pushes the trigger button down, which retracts the bolt 322 fully. Then the downward pressure is continued and the lever 304 is moved to its lower position shown in broken lines in FIG. 15 and moves the leg mechanisms and wheels to their extended, running positions. As the lever 304 moves down, its lefthand end comes into contact with sole 364 of the shoe 362 which permits the trigger button 318 to raise relative to the lever sufficiently for the latching bolt 322 (FIG. 16) to move partly under the latching block portion 328 when the lever 304 reaches its extreme lower position as viewed in FIG. 15. Then, on removal of the shoe 362 from the trigger button, the latching bolt (FIG. 16) is moved by the spring to its fully latched position and the trigger button moves up relative to the lever to its normal position. The wheels are then latched in their extended, operative or running positions.

To move the wheels from their extended, operative or running positions, the user tilts the cart forwardly to raise the wheels, engages the trigger button 318, and presses the button down. The latching bolt 322 is fully retracted and, upon release of the button, the weight of the wheels and legs swings the lever 304 upwardly beyond its lower latched position before the latching bolt can move back under the latching block portion 328 of the bottom housing 309. The wheels continue their movement to their collapsed positions and the latching bolt moves to its upper latching position over the latching block portion 328.

The above-described golf carts 12 and 300 are easily moved between their collapsed and extended operative conditions merely by pressing one's foot against the actuator 130 or 302. The parts are lightweight, strong and most, including even the links 86 and 98, may be of diecast material. Further, since the user never has to grasp with his hand any portions of the leg mechanisms of the carts to move them between these positions, there is never any danger of pinching his hand as there is with prior art carts though, with the carts 12 and 300, this danger would not be present since the links 86 and 98 always overlap each other even during their movements so that the fingers of the user cannot get between the links.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a golf cart,
a frame,
a pair of wheels,
a pair of leg means mounting the wheels pivotally relative to the frame between extended positions and collapsed positions,
a foot pedal actuator mounted movably on the frame,
coupling means interconnecting the actuator to the leg means,
and means for latching the actuator selectively in a first position holding the lever means in a first position holding the wheels in their extended positions and a second position holding the wheels in their collapsed positions.

2. In a golf cart,
a frame,
a rack member having a pair of racks thereon slidably mounted on the frame,
a pair of wheel-carrying leg means pivotally mounted on the frame and having gear portions on the ends thereof meshing with the racks,
a pair of wheels carried by the wheel-carrying leg means,
and manually operable means for moving the rack member to move the leg means relative to the frame.

3. The golf cart of claim 2 wherein the rack member and the gear portions are provided with intermeshing teeth drivingly operable during movement of the leg means relative to the frame and also being provided with engaging end portions adapted to rigidly interconnect the gear portions and the rack member when the leg means are in their extended positions relative to the frame.

4. The golf cart of claim 2 wherein the rack member has a pair of racks and the racks and the gear portions have teeth of a predetermined size operable during movement of the leg means relative to the frame, the racks and the gear also being provided with locking teeth of a size substantially larger than said predetermined size adapted to rigidly interconnect the gear portions and the racks when the leg means are in their extended positions relative to the frame.

5. In a golf cart,
a central frame,
a base secured to the lower end of the frame,
a handle secured to the upper end of the frame,
a bracket secured to the central portion of the frame and having pivot portions thereon,
a pair of leg means mounted pivotally at the ends thereof to the pivot portions of the bracket for movement between retracted positions extending generally along the lower portion of the frame and extended, operative positions extending outwardly and rearwardly of the frame,
a pair of wheels carried by the lower ends of the leg means,
a pedal actuator mounted movably at the lower end of the frame,
coupling means interconnecting the leg means the actuator for moving the leg means from their folded positions to their extended positions when the actuator is moved in a predetermined direction relative to the frame,
and latch means operable to hold the actuator in a position holding the leg means in their extended positions.

6. In a golf cart,
a central frame,
a base secured to the lower end of the frame,
a handle secured to the upper end of the frame,
a bracket secured to the central portion of the frame and having pivot portions thereon,
a pair of leg means mounted pivotally at the ends thereof to the pivot portions of the bracket for movement between retracted positions extending generally along the lower portion of the frame and extended, operative positions extending outwardly and rearwardly of the frame,
a pair of wheels carried by the lower ends of the leg means,
a pedal actuator mounted movably at the lower end of the frame,
coupling means interconnecting the leg means and the actuator for moving the leg means from their folded positions to their extended positions when the actuator is moved in a predetermined direction relative to the frame,
latch means operable to hold the actuator in a position holding the leg means in their extended positions,
and release means carried by the actuator for releasing the latch means when the actuator is pressed.

7. The golf cart of claim 6 wherein the release means includes a pedal portion mounted slidably on the actuator, and means operable by the pedal portion for releasing the latch means.

8. In a golf cart,
a tubular post,
a base secured to the lower end of the post,
a handle secured to the upper end of the post,
a bracket secured to the central portion of the post and having pivot portions thereon,
a pair of leg means mounted pivotally at the ends thereof to the pivot portions of the bracket for movement between retracted positions extending generally along the lower portion of the post and extended, operative positions extending outwardly and rearwardly of the post,
a pair of wheels carried by the lower ends of the leg means,
a pedal actuator mounted movably at the lower end of post,
coupling means interconnecting the leg means and the actuator for moving the leg means from their folded positions to their extended positions when the actuator is moved in a predetermined direction relative to the post,
latch means operable to hold the actuator selectively in a first position holding the leg means in their extended positions and a second position holding the leg means in their folded positons,
and release means carried by the actuator for releasing the latch means when the actuator is pressed.

9. In a golf cart,
a pair of wheels,
a pair of legs mounting the wheels on ends thereof,
an upright frame,
a central bracket clamped to the central portion of the frame,
means mounting the legs pivotally on the central bracket,
the central bracket being provided with a guideway therein,
and a slide mounted slidably in the guideway and extending downwardly out of the central bracket and including a pair of racks extending therealong and spaced angularly around the frame,
the legs being provided with arcuate gear segments mesh with the racks.

10. In a golf cart,
a pair of wheels,
a pair of legs mounting the wheels on ends thereof,
a frame,
a central bracket clamped to the central portion of the frame,
means mounting the legs pivotally on the central bracket,
the central bracket being provided with a guideway therein,
a slide mounted slidably in the guideway and extending downwardly out of the central bracket and including a pair of racks extending therealong and spaced angularly around the frame,
the legs being provided with gear segments meshing with the racks,
the racks and the gear segments being provided with intermeshing first teeth of a predetermined size adapted to pivot the legs relative to the frame and also being provided with teeth substantially larger than the first teeth adapted to intermesh and lock the legs against further movement when the legs are in their extended positions.

11. In a golf cart,
a frame,
a pair of wheels,
a pair of leg means pivotal on the frame and mounting the wheels for moving the wheels between folded positions adjacent the frame and operative positions spaced away from the frame,
coupling means connected to the leg means,
an actuator lever mounted pivotally on the frame and connected to the coupling means,
the free end of the actuator lever being provided with a guide portion,
a foot pedal mounted slidably on the guide portion,
a compression spring urging the foot pedal away from the lever and permitting movement of the foot pedal toward the lever,
a latching bar carried pivotally by the lever,
a latching block carried rigidly by the frame,
means urging the latching bar relative to the actuator lever toward a position engaging the latching block,
a pivotal camming dog carried by the foot pedal,
cam means provided on the latching bar,
the camming dog and latching bar having surfaces which, when the foot pedal is moved against the compression spring, cause the latching dog to initially cam the latching bar into a position out of latching engagement with the latching block and then permit free movement of the latching bar toward its latching position, the latching block serving to hold the latching bar out of latching engagement therewith by the latching bar when the lever is in its upper position or lower position.

12. In a golf cart,
an elongated frame,
a split bracket including a front cover on one side of the frame and a center block and a rear cover on the other side of the frame,
a plurality of legs,
the center block and the rear cover being provided with opposed arm portions defining clevises closely engaging the sides of the legs,
and means securing the legs pivotally to the center block and the rear cover.

13. The golf cart of claim 12 wherein
the center block has a guideway extending along the frame,
a slide mounted in the guideway,
the slide and the legs having interconnected driving portions,
and means for moving the slide along the guideway to pivot the legs.

14. The golf cart of claim 12 wherein
the center block has a pair of first plate portions extending angularly relative to each other to define a V-shaped opening,
and the rear cover has a pair of plate portions spaced from and parallel to the first plate portions to define the clevises therewith.

15. In a golf cart,
an elongated, generally vertically extending frame,
a pair of leg means pivotally mounted at one end of each to an intermediate portion of the frame between extended positions and collapsed positions,
a pair of wheels carried by the other ends of the pair of leg means,
drive means mounted movably on the frame and drivingly coupled to the leg means for simultaneously moving the leg means between the collapsed positions thereof and the extended positions thereof,
manual actuating means mounted movably on the frame for operating the drive means and including a foot pedal positioned near the bottom end of the frame,
and means coupling the foot pedal to the drive means.

16. In a golf cart,
an elongated frame having a lower portion and an intermediate portion,
a pair of leg mechanisms pivotally connected to the intermediate portion of the frame for movement relative to the frame between collapsed and extended positions,
a pair of wheels carried by the leg mechanisms,
a lever pivotally connected at one end thereof to the lower portion of the frame between an upper position and a lower position,
a trigger button pivotally mounted on the other end of the lever,
means coupling the lever to the leg mechanisms for moving the leg mechanisms from their extended positions to their collapsed positions when the lever is moved by the foot of the user from its upper position to its lower position and permitting movement of the leg mechanisms from their extended positions to their collapsed positions when the lever is moved from its lower position to its upper position,
a latching block secured to the frame,
a latching bolt mounted on the lever for movement therealong between a latching position in latching engagement with the latching block and a releasing position out of latching engagement with the latching block,
and means coupling the trigger button to the latching bar for moving the latching bar to its releasing position when the trigger button is moved from its upper position toward its lower position,
the trigger button projecting above the lever a distance such that when the lever is in its upper position so that the foot of a user tends to depress the trigger button before engaging and depressing the lever, the lever is depressed, the foot of the user engages the lever and permits the trigger button to raise relative to the lever to permit the latching bolt to engage the latching block portion as the lever reaches its lower position and the trigger button is released.

17. In a golf cart,
an elongated frame having a lower portion and an intermediate portion,
a pair of leg mechanisms pivotally connected to the intermediate portion of the frame for movement relative to the frame between collapsed and extended positions,
a pair of wheels carried by the leg mechanisms,
a lever having a first end portion and a second end portion and pivotally connected at the first end portion thereof to the lower portion of the frame between an upper position and a lower position,
a trigger button pivotally mounted on the other end of the lever,
means coupling the lever to the leg mechanisms for moving the leg mechanisms from their extended positions to their collapsed positions when the lever is moved by the foot of the user from its upper position to its lower position and permitting movement of the leg mechanisms from their extended positions to their collapsed positions when the lever is moved from its lower position to its upper position,
a latching block secured to the frame,
a latching bolt mounted on the lever for movement therealong between a latching position in latching engagement with the latching block and a releasing position out of latching engagement with the latching block,
and a trigger button coupled to the latching bolt, mounted movably on the second end portion of the lever and normally urged to a position projecting above the lever a distance such that when the lever is in its upper position the foot of a user engages and tends to depress the trigger button to move the latching bolt to its releasing position before engaging and depressing the lever.

References Cited by the Examiner

UNITED STATES PATENTS 2,791,436 5/1957 Wuerthner ___________ 280—38
2,926,925 3/1960 Ozlek ________________ 280—42

ARTHUR L. LA POINT, *Primary Examiner.*